United States Patent [19]

Edwards et al.

[11] 4,408,805
[45] Oct. 11, 1983

[54] CONTROL VALVE ASSEMBLIES FOR HYDRAULIC BRAKING SYSTEMS

[75] Inventors: Roy E. Edwards, Warley; Anthony G. Price, Birmingham, both of England

[73] Assignee: Lucas Industries Limited, Birmingham, England

[21] Appl. No.: 268,006

[22] Filed: May 28, 1981

[30] Foreign Application Priority Data

Jun. 17, 1980 [GB] United Kingdom ................. 8019806

[51] Int. Cl.³ ............................................ B60T 13/00
[52] U.S. Cl. .................................... 303/6 A; 60/581; 188/16; 188/354
[58] Field of Search ................. 303/6 A, 6 R, 50–56, 303/10–12, 6 C, 6 M, 114, 84 A; 188/16, 354, 345, 151 A; 60/547–550, 581, 582, 566, 562, 553, 560, 589, 561

[56] References Cited

U.S. PATENT DOCUMENTS

| | | | |
|---|---|---|---|
| 3,568,441 | 3/1971 | Walker | 188/345 |
| 3,640,067 | 2/1972 | Ingram | 60/581 X |
| 4,178,757 | 12/1979 | Ketterling et al. | 60/581 X |

FOREIGN PATENT DOCUMENTS 2078325  1/1982  United Kingdom ............... 303/6 A

*Primary Examiner*—Douglas C. Butler
*Attorney, Agent, or Firm*—Scrivener, Clarke, Scrivener and Johnson

[57] ABSTRACT

In a dual hydraulic braking system in which brakes on opposite sides of a vehicle can be applied simultaneously for retarding or independently for steering the vehicle, a dual control valve assembly ensures that the brakes on one side cannot be applied before the brakes on the opposite side. When the brakes on one side are to be applied independently, a stem carrying inlet and exhaust valve heads moves with a pedal-operated piston so that the exhaust valve head engages with a valve spool to close an exhaust passage. The spool moves with the piston and head until it is arrested by a stop face, whereafter a seating on the piston moves away from the inlet valve head to allow pressurized fluid to be supplied to the outlet for the brakes. When the brakes are to be applied simultaneously, a volume of fluid trapped in a transfer connection between the exhaust valve heads arrests movement of the spools to ensure that the inlet valves open simultaneously.

7 Claims, 1 Drawing Figure

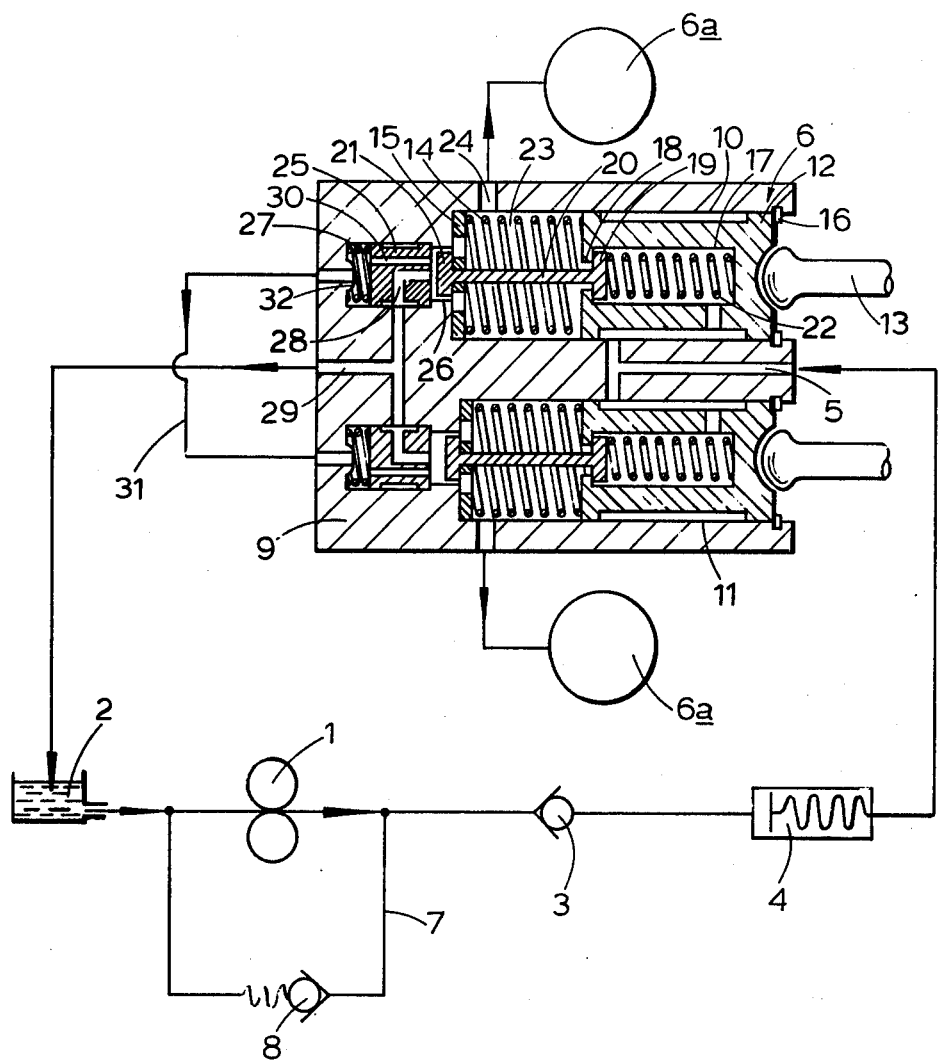

CONTROL VALVE ASSEMBLIES FOR HYDRAULIC BRAKING SYSTEMS

SPECIFIC DESCRIPTION

This invention relates to improvements in control valve assemblies for vehicle dual hydraulic braking systems of the kind commonly used on agricultural tractors and like vehicles in which separate brake-applying valves are operable independently or simultaneously by independently operable pedals to cause hydraulic fluid under pressure to be supplied to one or both of a pair of outlets for connection to brakes on wheels on opposite sides of a vehicle.

The brake-applying valves may be housed in a common housing and can be operated simultaneously for retarding the vehicle or separately for steering.

Known control valve assemblies of the kind set forth are usually operated by a yoke comprising a one-piece member which is pivotally connected at substantially the mid-point in its length to a valve-operating mechanism for controlling the hydraulic fluid under pressure and, at opposite ends, is coupled to different pedals, the yoke also being provided with spaced abutments for operating the brake-applying valves. When both pedals are operated simultaneously the yoke is moved bodily away from the housing to withdraw and operate the valve operating mechanism and allow both brake-applying valves to open or remain open so that the hydraulic fluid under pressure is supplied to both outlets. When one pedal is operated on its own, initially the yoke pivots about the pivotal connection with the valve-operating mechanism with the abutment for the brake-applying valve corresponding to that pedal moving away from the said brake-applying valve which can open or remain open and the other abutment closing the other brake-applying valve. Further movement of that pedal in the same direction acts through the yoke to close or increase a closing force applied to the said other brake-applying valve, and withdraws the valve-operating mechanism from the housing so that pressurised fluid is supplied through the open brake-applying valve to the brakes on that side of the vehicle.

According to our invention a control valve assembly of the kind set forth comprises a pair of pedal-operated brake-applying pistons working in separate bores to control the supply to brakes on opposite sides of a vehicle of pressure fluid in pressure spaces in the bores in advance of the pistons, a normally closed inlet valve associated with each piston for isolating a source of high pressure fluid from a respective pressure space, a normally open exhaust valve associated with each piston for providing communication between a respective pressure space and a reservoir for fluid, movement of a piston in a brake-applying direction closing the respective exhaust valve to isolate the pressure space from the reservoir and thereafter opening the inlet valve whereby pressure fluid from the source is supplied to the pressure space, and balancing means for ensuring that following closure of both exhaust valves, both inlet valves can only open substantially simultaneously when both pedals are operated simultaneously.

This ensures that the brakes on one side of a vehicle cannot be applied before the brakes on the opposite side when both pedals are operated simultaneously.

The balancing means may comprise a transfer connection which interconnects the pressure spaces through transfer passages in valve spools when the exhaust valves are open. Closure of an exhaust valve by engagement of a head with an adjacent end of a respective spool to close an exhaust passage in the spool also closes the transfer passage, but the respective inlet valve cannot open until movement of the spool in a brake-applying direction with the piston and the head has been arrested. When one pedal is operated on its own this is achieved by the engagement of the spool with a stop face. However, when both pedals are operated together this is achieved by the column of fluid which is trapped in the transfer passages and the transfer connection, between the heads of the exhaust valves.

One embodiment of our invention is illustrated in the single FIGURE of the accompanying drawings which is a layout of a dual hydraulic braking system for a vehicle.

In the braking system illustrated in the drawing a pump 1 is arranged to draw fluid from a reservoir 2 and pump it through a one-way valve 3 to an hydraulic accummulator 4. The accummulator 4 supplies fluid under pressure to an inlet 5 of a dual control valve assembly 6 which controls the supply of fluid to brakes 6a on wheels on opposite sides of the vehicle depending upon whether one or both of a pair of pedals are operated independently or simultaneously. The pump 1 is driven continuously and, when the accummulator 4 is fully charged, fluid is returned from the pump 1 to the reservoir 2 through a by-pass passage 7 which includes a one-way valve 8 to prevent reverse circulation.

The dual control valve 6 comprises a housing 9 provided with two parallel stepped bores 10, 11, each incorporating a single pedal-operated control valve.

Since both control valves are identical only one need be described.

A piston 12 working in the portion of the bore 10 which is of greater diameter is engaged at its rear end by a pedal-operated push-rod 13. A return spring 14 acting between an apertured stop member 15 in abutment with a shoulder at a step at the change in diameter normally urges the piston 12 at its outer end against a stop 16 in the housing 9.

The piston 12 has a central blind bore 17 formed at its inner end with a radial flange 18 forming a seating for a inlet valve head 19 which is carried by a stem 20 projecting axially through the stop member 15 and carrying an exhaust valve head 21. A spring 22 normally urges the head 19 into engagement with the seating 18 to isolate the inlet 5 from a pressure space 23 in advance of the piston 12, which pressure space is connected to the wheel brake 6a on one side of the vehicle through an outlet port 24.

A spool 25 is slidably guided in the portion of the bore 10 which is of smaller diameter and is normally held in engagement with a stop face 26 surrounding the head 21 by means of a spring 27. The spool 25 has an exhaust passage 28 formed by an axial passage and a radial port which provides communication between the pressure space 23 and a low pressure outlet 29 in the housing 9 which is connected to the reservoir 2. The spool 25 also has an axial through-bore 30 defining a transfer passage which is connected to the transfer passage of the other control valve through a transfer connection 31.

In the inoperative "brake-off" position shown in the drawing the inlet heads 19 are in engagement with the seatings 18 to isolate the high pressure inlet 5 from the pressure spaces 23, and the pressure spaces 23 are in communication with the reservoir 2 through the exhaust passages 28 and the low pressure outlet 29.

When one pedal is operated on its own, say the pedal acting on the piston 12 in the bore 10, initial movement of the piston 12 causes the head 21 to engage the adjacent end of the spool 25, thereby isolating the pressure space 23 from the reservoir 2 and from the other pressure space by closing the inner ends of the exhaust passage 28 with the transfer passage 30. Since the spring 22 is stronger than the spring 27 further movement of the piston 12 in the same direction carries the spool 25 with it with the head 19 remaining in engagement with the seating 18 until movement of the spool 25 and the head 21 is arrested by engagement with a stop face 32 at the adjacent end of the bore 10. Additional movement of the piston 12 then causes the seating 18 to move away from the inlet head 19 so that fluid under pressure can be supplied from the inlet 5 and to the outlet port 24 through the pressure space 23.

When both pedals are operated simultaneously, the exhaust valve heads 21 engage with the spools 25 and the spool 25 are advanced in their bores as described above. However, in this instance, movement of the spools 25 with the pistons 12 is arrested by the volume of fluid in the transfer passages 30 and the transfer connection 31 which is trapped between the exhaust valve heads 21. Thereafter both inlet valve seats 18 move away from the heads 19 simultaneously so that fluid from the inlet 5 is supplied through both pressure spaces 23 to the brakes on the wheel on both sides of the vehicle.

The distance through which one spool 25 can move before engaging the stop 32 when one pedal is operated on its own is chosen to be greater than the distance through which the exhaust valve head 21 of the other control valve must move before it can engage within its respective spool 25. This ensures that, when both pedals are operated together, movement of the spool 25 can be arrested only by the trapped volume of fluid.

Should the pump 1 fail or the accummulator 4 because exhausted, or both, the brakes can be operated hydrostatically with the or each piston 12 acting to pressurise fluid trapped in a respective pressure space 23 by the one-way valve 3 which prevents reserve flow to the pump 1 and the by-pass passage 7.

We claim:

1. A dual hydraulic braking system for a vehicle comprising a source of high pressure hydraulic fluid, a reservoir for fluid, brakes on wheels on opposite sides of the vehicle, a control valve assembly for controlling the supply of high pressure fluid to said brakes, and independently operable pedals for operating said control valve assembly to cause fluid under pressure to be supplied to the respective brakes on opposite sides of the vehicle, said control valve assembly comprising a housing having separate bores, a pedal-operated piston working in each of said bores, pressure spaces defined by said bores in advance of said pistons, a normally closed inlet valve associated with each of said pistons for isolating said source from said pressure space, a normally open exhaust valve associated with each of said pistons for providing communication between said pressure space and said reservoir, a pair of outlets for connecting said pressure spaces to said brakes on opposite sides of the vehicle, each of said pistons being movable in a brake-applying direction to close a respective one of said exhaust valves and thereafter to open a respective one of said inlet valves whereby fluid under pressure is supplied to a respective one of said pressure spaces, and a transfer connection which is adapted to interconnect said pressure spaces when said exhaust valves are open and which ensures that, when both said pedals are operated simultaneously, both said inlet valves can only open substantially simultaneously following closure of both said exhaust valves.

2. A braking system according to claim 1, wherein each of said exhaust valves comprises an exhaust valve head and an exhaust valve spool, said spool having a face adjacent to said exhaust valve head and a face remote from said exhaust valve head, and being provided therein with an exhaust passage for connection to said reservoir and a transfer passage connected to said transfer connection, and said exhaust valve head being engageable with said adjacent face of said spool to close said exhaust passage and also to close said transfer passage.

3. A braking system according to claim 2, wherein each of said bores comprises a stepped bore having portions of larger and smaller diameter, a respective one of said valve spools being slidably guided in said portion of smaller diameter, and being movable with a respective piston and associated exhaust valve head in said brake-applying direction upon engagement of said head with said adjacent face of said spool, each one of said inlet valves being prevented from opening until movement of the respective one of said exhaust valve spools in said brake-applying direction is arrested, and arrestation means being provided in said smaller diameter portion of each of said bores for arresting movement of the respective one of said spools in said brake-applying direction.

4. A braking system according to claim 3, wherein said arrestation means comprises a stop face, engagement of said face of said spool remote from said exhaust valve head with said stop face arresting movement of said spool in said brake-applying direction when only the respective one of said pedals is operated, and a volume of fluid trapped in said transfer connection and said transfer passages arresting movement of both of said spools in said brake-applying direction before each of said faces remote from said exhaust valve heads engages with a respective stop face when both pedals are operated together.

5. A braking system according to claim 4, wherein the distance between said face remote from said valve head of each spool and its respective stop face is greater than the distance between said face adjacent to said valve head of the other of said spools and its respective valve head.

6. A braking system according to claim 3, wherein said inlet valve comprises an inlet valve head and an inlet valve seating, said head normally engaging in a closed position with said seating, and said head and said seating being relatively movable to open said inlet valve only when movement of said spool in said brake-applying direction is arrested.

7. A braking system according to claim 6, wherein each piston has a central blind bore having a closed end and a radial flange at its opposite end which comprises the inlet valve seating, a stem extends through said radial flange and carries at opposite ends said inlet and exhaust valve heads, and a spring acts between said closed end of said inlet valve head to urge said head normally into engagement with said radial flange, said exhaust valve head normally being spaced from said adjacent end of said valve spool.

* * * * *